(12) United States Patent
Larson

(10) Patent No.: US 8,602,363 B2
(45) Date of Patent: Dec. 10, 2013

(54) POWER GENERATING KITE SYSTEM

(76) Inventor: Quinn Larson, Friendswood, TX (US)

( * ) Notice: Subject to any disclaimer, the term of this patent is extended or adjusted under 35 U.S.C. 154(b) by 323 days.

(21) Appl. No.: 13/099,496

(22) Filed: May 3, 2011

(65) Prior Publication Data

US 2011/0272527 A1 Nov. 10, 2011

Related U.S. Application Data

(60) Provisional application No. 61/331,853, filed on May 6, 2010.

(51) Int. Cl.
*F03D 9/00* (2006.01)
*B64C 31/06* (2006.01)

(52) U.S. Cl.
USPC ........................................ 244/155 A; 290/44

(58) Field of Classification Search
USPC ............ 244/33, 153 R, 155 R, 155 A; 290/44
See application file for complete search history.

(56) References Cited

U.S. PATENT DOCUMENTS

| | | | |
|---|---|---|---|
| 6,523,781 B2 * | 2/2003 | Ragner | 244/153 R |
| 7,275,719 B2 * | 10/2007 | Olson | 244/155 A |
| 7,504,741 B2 * | 3/2009 | Wrage et al. | 290/55 |
| 7,656,053 B2 * | 2/2010 | Griffith et al. | 290/44 |
| 7,775,483 B2 * | 8/2010 | Olson | 244/153 R |
| 8,002,216 B2 * | 8/2011 | Decker | 244/58 |
| 8,134,249 B2 * | 3/2012 | Ippolito et al. | 290/55 |
| 8,247,912 B2 * | 8/2012 | Da Costa Duarte Pardal et al. | 290/44 |

\* cited by examiner

*Primary Examiner* — Rob Swiatek
(74) *Attorney, Agent, or Firm* — Michael Ries

(57) ABSTRACT

A power generating kite system that includes a kite or an airfoil that receives wind, a control unit that includes one or more computers or microcontrollers, GPS receivers and accelerometers that control the kite system, a winch system and a rope attached to the kite that is automatically controlled by the control unit and a launch and recovery system that includes a hydraulic telescoping pole that assists in launching and retrieving the kite. The kite system also includes a yaw motor that turns the kite system at an appropriate angle to increase energy production, a flywheel that bridges converting kinetic energy from the wind and kite into electrical energy, a plurality of weather instruments, an electrical generator to generate electrical energy and a secure base structure to secure the kite system to a ground surface, an ocean platform, or a large ship.

20 Claims, 3 Drawing Sheets

Graph 1: A Typical Statistical Maximum Wind Speed Curve

POWER GENERATING KITE SYSTEM

This application claims priority to U.S. Provisional Application 61/331,853 filed on May 6, 2010, the entire disclosure of which is incorporated by reference.

TECHNICAL FIELD & BACKGROUND

There are many ways to generate electricity that include nuclear, hydroelectric, natural gas, coal, wind, and solar systems. Depending on the system, the cost per kilowatt hour can vary significantly. For example, the most cost effective system is currently natural gas with a cost of approximately 3.9¢ and 4.4¢ per kilowatt hour while a solar system is one of the more expensive systems at a cost of approximately 15¢ to 30¢ per kilowatt hour. One viable possible alternative that has become relatively competitive in price is a wind system with an approximate cost per kilowatt hour of 4¢ to 6¢.

Power or traction kites have the ability to generate very large forces as they move through the air. These kites can also be maneuvered in such a way that there is very little force being exerted on them. This change in force can be utilized to generate electricity. As the kite is being pulled, it can generate electricity as well as store energy in a flywheel device. The kite can then be put in a minimal pull configuration, and be reeled in with a winch while electricity is being generated using the energy stored in the flywheel device. The kite is then placed in a pulling configuration and the energy generating cycle is repeated.

When more than one kites are placed together, the kites can be configured to fly in formation. This minimizes the environmental footprint that would be required for multiple power generating kite systems. An energy storage device may not be needed when multiple kites are working in tandem.

As the winds slow where energy production is no longer viable, the kites are reeled in and stowed. They are then kept in a stowed configuration until the wind becomes strong enough to launch the kites again. The cost of a windmill is relatively high due to all of the material that goes into these relatively large structures. The cost of a kite generating system will be relatively inexpensive since many of its components that make up a kite are relatively inexpensive.

While wind capacity is quickly growing in the United States, most of the country's electricity still comes from burning fossil fuels. Due to concerns regarding climate change, the burning of fossil fuels and recent nuclear problems in Japan, there has been an increasing interest in the development of inexpensive green energy. The best solution for our energy needs is to develop a green technology that generates electricity more cost effective than other methods, including those associated with burning fossil fuels. With such a technology, the marketplace will naturally phase out the burning of fossil fuels for electricity production.

The present invention utilizes large scale kites or airfoils to harness energy from steady and stronger winds at higher altitudes to generate affordable green energy. Unlike traditional windmills whose structures limit their operations to altitudes under approximately 80-100 meters, a power generating kite system can perform at altitudes ranging from approximately 100-300 meters allowing adaptation to relatively more productive wind conditions. Compared to the cost of wind turbines, a kite has the potential to reduce energy costs by over a factor of three. Once these components are mass produced, the savings could be much greater.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

Figure 1A:
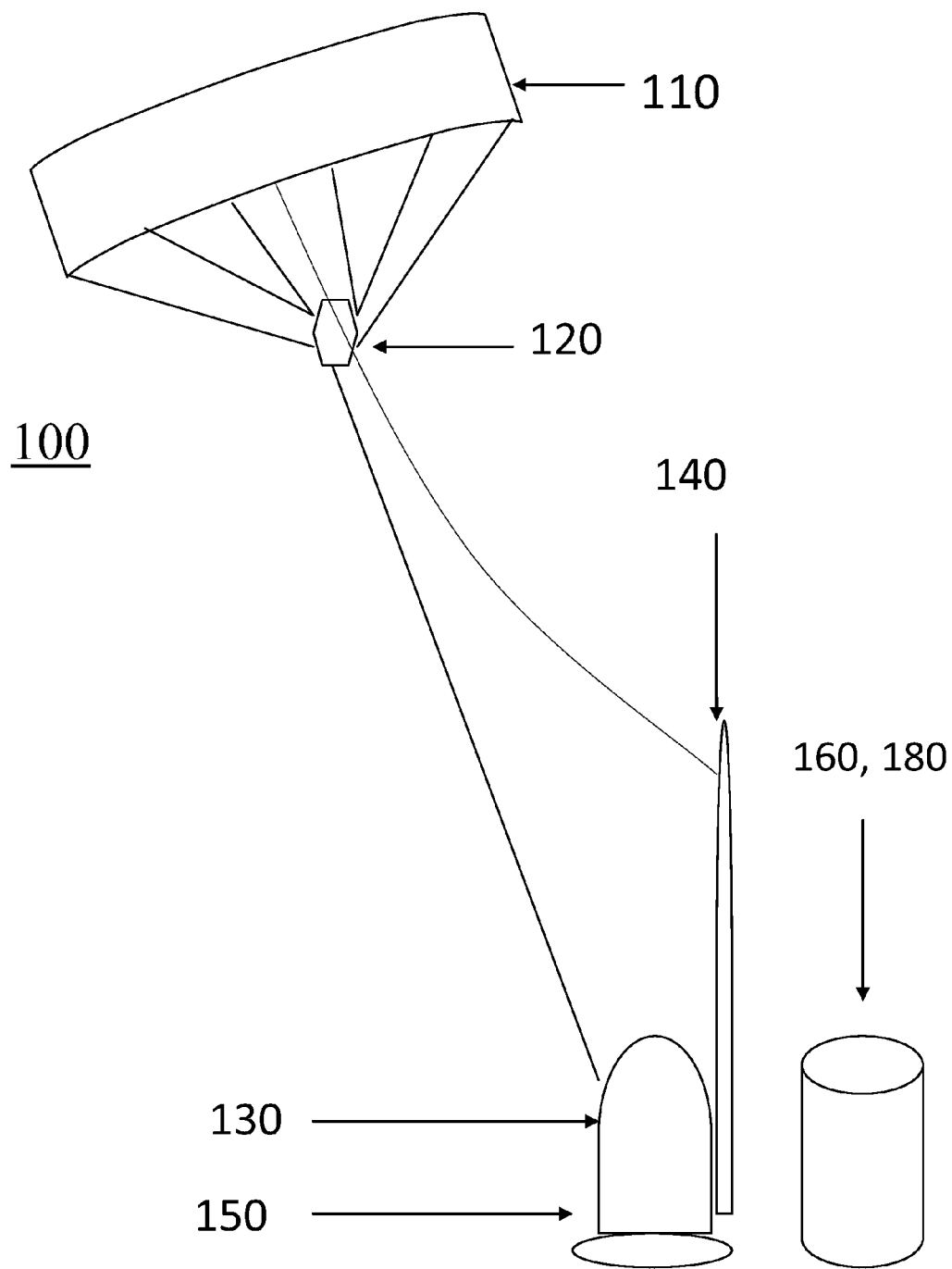
FIG. 1A illustrates a side perspective view of a power generating kite system, in accordance with one embodiment of the present invention.

FIG. 1A illustrates a side environmental perspective view of a power generating kite system 100, in accordance with one embodiment of the present invention. The power generating kite system 100 can be installed on the ground, ocean platform, a ship or other suitable venues. The power generating kite system 100 includes a kite or airfoil 110, a control unit 120, a winch system 130 with a rope 132, a launch and recovery system 140, a yaw motor 150, a flywheel 160 and a generator 180. Further details regarding the kite or airfoil 110, the control unit 120, the winch system 130 with the rope 132, the launch and recovery system 140, the yaw motor 150, the flywheel 160 and the generator 180 are provided in FIG. 1B and its description.

Figure 1B:
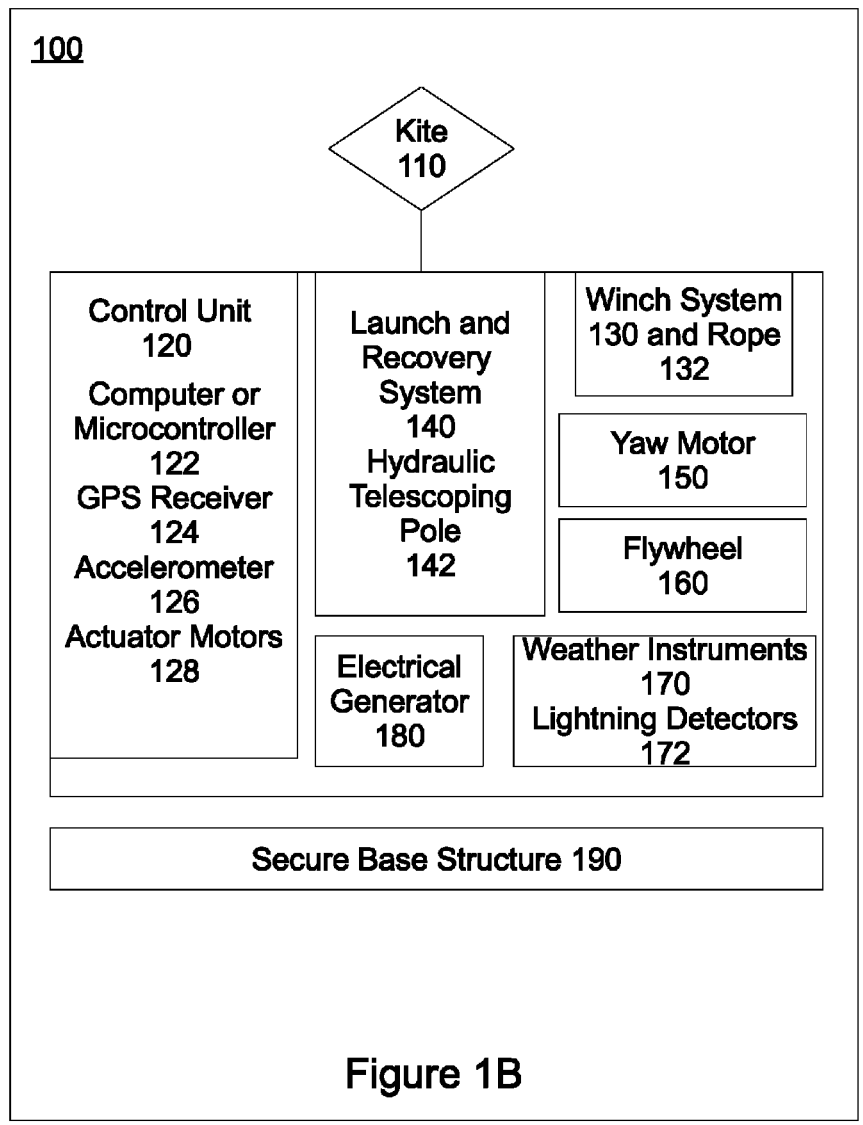
FIG. 1B illustrates a block diagram of a power generating kite system, in accordance with one embodiment of the present invention.

FIG. 1B illustrates a block diagram of a power generating kite system 100, in accordance with one embodiment of the present invention. The power generating kite system 100 includes a kite or airfoil 110, a control unit 120, a winch system 130 with a rope 132, a launch and recovery system 140, a yaw motor 150, a flywheel 160, a plurality of weather instruments 170, a generator 180 and a secure base structure 190.

The kite 110 can be any suitable type of airfoil that is allowed to rise into the air until reaching an altitude where wind conditions are relatively strong, such as in the approximate range of 100 to 300 meters. The kite 110 operates in two primary modes, a pulling mode when there is wind force exerted on the kite 110 and a non-pulling mode when the exerted wind force is minimal. The control unit 120 utilizes embedded computers and/or microcontrollers 122, a GPS receiver 124, an accelerometer 126 and a plurality of actuator motors 128 to automatically navigate the kite 110. The embedded computers and/or microcontrollers 122 may be distributed with part of the functionality at the kite level and part on the ground. This distributed network may communicate information on a communications network such as the Internet, an intranet, a LAN, a WAN or other suitable communications network. For redundancy purposes, the control unit 120 may include multiple embedded computers or microcontrollers 122, GPS receivers 124, accelerometers 126 and/or actuator motors 128. The winch system 130 and rope 132 are utilized to reel the kite 110 inward or outward depending on a plurality of circumstances such as weather and operational variables and other applicable circumstances. The winch system 130 operating speed is automatically controlled by the control unit 120. In the event of overstress, the winch system 130 releases the rope 132 at an appropriate rate to allow the control unit 120 to reposition the kite 110 into a relatively more favorable position with relatively less force. In circumstances where there is a sudden loss of wind, the winch system 130 would retract the kite 110 at an appropriate rate that would allow the control system 120 to maintain stability. The launch and recovery system 140 assists in launching and retrieving the kite 110. The launch and recovery system 140 includes a hydraulic telescoping pole 142 that lifts the kite 110 and is raised to catch the kite 110 as it is lowered as well.

The yaw motor 150 turns the power generating kite system 100 at an appropriate angle with respect to environmental wind direction to increase relative energy production. The flywheel 160 bridges the conversion of the pulsed energy from the wind and the kite 110 to continuous electrical energy. At times, the flywheel 160 stores the kinetic energy produced by the kite 110 when it is in the pulling configuration. As the kite 110 transitions into a non-pulling phase, the rotational energy of the flywheel 160 is utilized to generate electricity. The bridge between the winch and the flywheel may be either mechanical or electrical. The mechanical option would use gears and clutches. The electrical option would use a motor/generator to drive the winch or receive electricity from it. The weather instruments 170 are utilized to measure the environmental wind speed, wind direction, and humidity. These measured variables drive the control unit 120 to determine a relatively productive kite 110 placement. The weather instruments 170 may also utilize one or more lightning detectors 172 if desired or needed, or other suitable weather instruments. The generator 180 is an electrical generator that works in combination with the control unit 120, the winch system 130, the launch and recovery system 140, the yaw motor 150 and the flywheel 160 and can be any suitable electrical generator. The secure base structure 190 provides stability to the power generating kite system 100 and is turned by the yaw motor 150 at an appropriate angle with respect to environmental wind direction to increase relative efficiency.

The power generating kite system deploys a large kite or airfoil at an altitude where winds are sufficiently strong and stable. By changing the angle of how the airfoil faces into the wind, the force on the airfoil can be varied from relatively very large to relatively very small. During the periods of large force, the kite is allowed to pull out the rope that it is tethered to, and during periods of low force the rope is reeled back in. Similar to pulling a starter rope to provide the force to engage a lawn mower, this back and forth motion from the kite is converted into rotational energy. As the kite is pulling, the energy is utilized to generate electricity and any surplus energy is stored in a flywheel. When the kite is being reeled back in, the kinetic energy from the flywheel is utilized to generate electricity.

The force (F) generated by a kite or any airfoil is dependent on the lift coefficient of the kite $c_l$, the air density $\rho$, airflow velocity v, and the kite's surface area A.

$$F = c_l \rho v^2 A$$

Since the force is a function of the square of the wind velocity, as the velocity of the wind doubles, the energy available from that wind quadruples. Costs for producing electricity by wind can be reduced significantly if technology is created that can access stronger wind speeds currently available at relatively higher altitudes.

Figure 2:
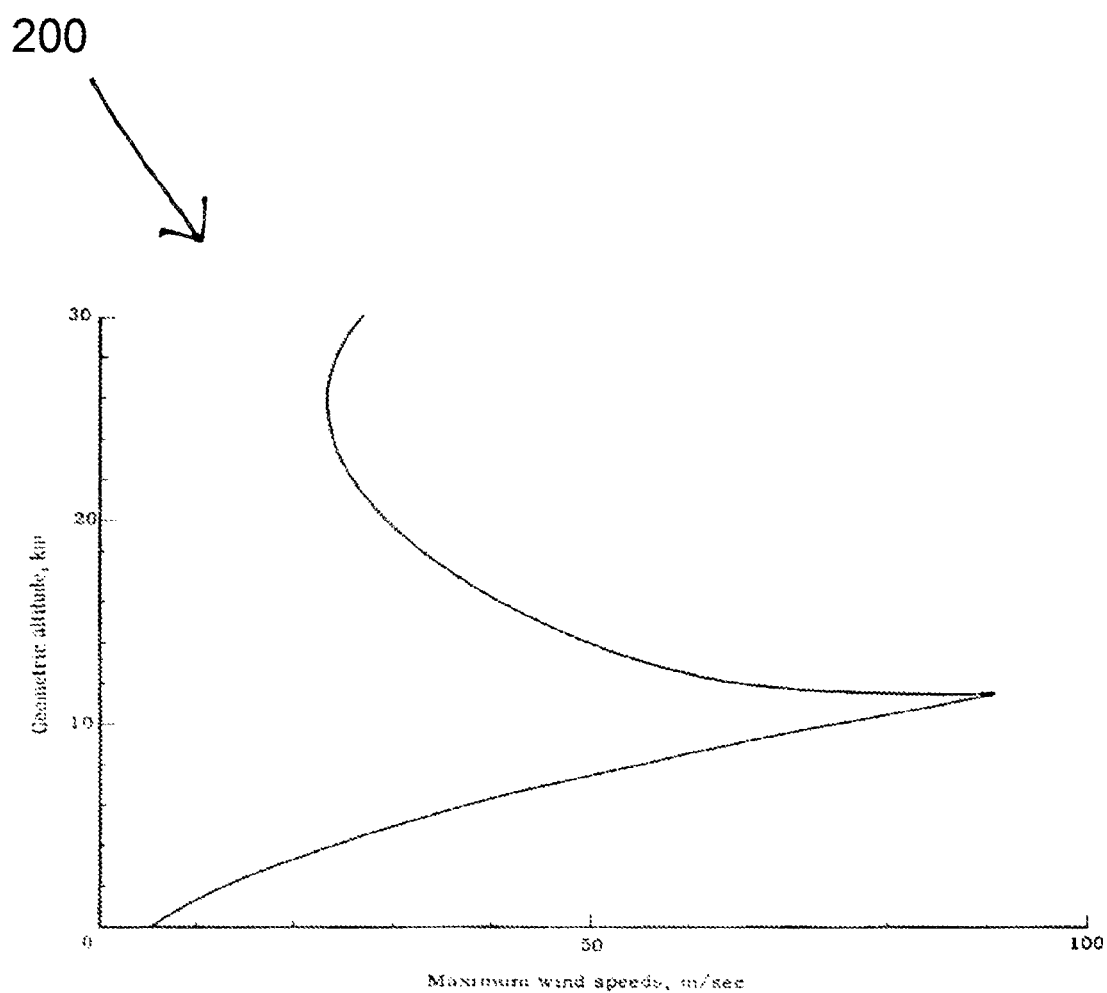
FIG. 2 illustrates a graph of a statistical maximum wind speed curve, in accordance with one embodiment of the present invention.

FIG. 2 illustrates a graph 200 of a statistical maximum wind speed curve, in accordance with one embodiment of the present invention. The graph 200 shows the relationship between maximum wind speeds and altitude. For the first approximate 10-12 km, the winds increase with altitude. At an altitude of approximately 300 m, the energy available is doubled compared to the wind speed at ground level. Besides the increased wind speeds, there is an additional advantage of having the capability to fly at relatively higher altitudes. The winds at these higher altitudes become relatively more constant due to less interaction with the ground. The power generating kite system utilizes this increased and steady energy source.

Even though large kites have not yet been employed for generating electricity, they have found practical use for other applications. One of these applications is to use these kites to tow large ocean going ships. The use of these kites has proven to greatly reduce the fuel costs to operate these ships. Commercially, it has been demonstrated that automated control systems for large kites are not only feasible, but are in use today and have the potential to generate extremely large forces.

The standard industry cost for wind power generation is approximately $1,000 per kilowatt. This means that a 3.5 megawatt wind turbine would cost approximately $3,500,000. The following is a cost estimate for the components of a power generating kite system that is capable of generating 3.5 megawatts.

A ship traveling at a true wind direction of 130° at a speed of 10 knots with a wind speed of 25 knots will have a load of approximately 1 ton per square meter on the towing kite. Under these conditions a 128 square meter kite would produce over 6 megawatts of power. By cycling from 0 watts for a short period of time to 6 megawatts, the kite should be able to sustain approximately 3.5 megawatts of average power.

Commercial entities or persons recently purchased a 3 meter power kite from China for $50. By extrapolation, the 128 meter kite would cost approximately $2,133. This is a relatively low estimate when considering that more relatively expensive materials would be utilized for this application, but if mass produced, the power kite should be less than $15,000.

The control unit includes a GPS system, an accelerometer, one or more micro controller or computers, and actuator motors. These components are all relatively inexpensive ($200 or less for each GPS system, accelerometer, and micro controller unit), and the entire control unit should cost less than approximately $10,000. Three hundred and fifty meters of strong lightweight rope should cost approximately $10,000 or less.

The winch will need to be able to handle large forces. A standard vehicle winch with a capacity of 6 tons may be purchased for approximately $500, so $100,000 should be more than sufficient to purchase a winch that can handle loads of more than 100 tons. The launch and recovery system includes a telescoping pole that rises to launch the kite as well as catch it when it is being lowered. An estimated cost for the launch and recovery system is approximately $50,000. The flywheel stores energy in the form of rotational energy. The flywheel will need to store enough energy to produce approximately 3.5 megawatts in the range of approximately 20 to 30 seconds. This should be enough time to reel the kite back to its desire length.

The equation for rotational energy is: $K=\frac{1}{2} I\omega^2$ where K is the kinetic energy, I is the inertia, and $\omega$ is the angular speed. I (Inertia)=$\frac{1}{2} mr^2$ (for a solid cylinder) where m is mass and r is the radius. Using this equation, either of the following configurations would provide enough energy: a solid cylinder with a mass of 20,000 kg, radius 3 meters at 500 rpm, or a solid cylinder with a mass of 200 kg, radius 0.5 meters at 30,000 rpm. Cost for a flywheel would be approximately $200,000 but could vary greatly depending on its design.

A new 3.5 megawatt generator is available for approximately $60,000. This generator may not be appropriate for this application, however approximately $100,000 should be a reasonable cost estimate for the generator. The cost of the structure to keep the kite firmly attached to the ground, ocean platform, or large ship is unknown, although this could be done for an estimated $200,000. Any additional parts which would include clutches, gears, or a motor/generator and other accessories should cost less than approximately $200,000.

Many of these estimates should be relatively high and hopefully one these components are mass produced, the cost should be much lower, however given the current estimates, it should cost less than $1,000,000 to build a 3.5 megawatt power generating kite system.

TABLE 2

Cost Estimate for a Power Generating Kite System Capable of Generating 3.5 megawatts

| Component | Estimated Price |
| --- | --- |
| 128 meter kite | $ 15,000 |
| Control Unit (GPS system, accelerometers, micro-controller, actuators) | $ 10,000 |
| 350 m strong lightweight rope | $ 10,000 |
| Winch to support large forces | $100,000 |
| Launch and recovery system including telescoping pole | $ 50,000 |
| Flywheel | $200,000 |
| 3.5 megawatt generator | $100,000 |
| Secure base structure | $200,000 |
| Miscellaneous parts (clutches, gears, motor/generator, etc.) | $200,000 |
| Yaw motor | $ 20,000 |
| Weather instruments | $ 5,000 |
| Flight software development, testing, and maintenance (per unit) | $ 50,000 |
| Operational costs (system monitoring, repairing, upgrades, etc) | $ 25,000 |
| Total Approximate Cost | $985,000 |

The power generating kite system can potentially produce green energy at a relatively very low price. The concept capitalizes on the stronger steady wind source available at higher altitudes that cannot currently be accessed with traditional methodologies. The added complexity of a flying power generating kite system compared to a grounded wind mill structure is offset by the substantial increase in potential performance and cost savings. Although several technical challenges still need to be overcome, most of the technology needed to make a power generating kite system operational has already been demonstrated by others. The next pivotal step is to piece these already existing capabilities toward a new innovative application.

A prototype power generating kite system to prove the feasibility of a relatively larger model could be built for a relatively minimal cost. Once operational, a large array of power generating kite systems could be flown in formation to limit the land footprint for multiple power generating kite systems. Wind is very abundant and could easily provide for all of the energy needs of the United States as well as the world. Wind is always blowing somewhere rain or shine, night or day.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A power generating kite system, comprising:
   a kite or an airfoil that receives wind;
   a control unit that includes one or more computers or microcontrollers, global positioning system receivers and accelerometers that control said kite system;
   a winch system and a rope attached to said kite or airfoil that is automatically controlled by said control unit;
   a launch and recovery system that includes a hydraulic telescoping pole that assists in launching and retrieving said kite or airfoil;
   a yaw motor that turns said kite system at an appropriate angle to increase energy production;
   a flywheel that bridges converting kinetic energy from said wind and said kite or airfoil into electrical energy; and
   an electrical generator that works in combination with said control unit, said winch system, said launch and recovery system, said yaw motor and said flywheel to generate electrical energy.

2. The system according to claim 1, wherein said kite or airfoil operates in a pulling mode when there is wind force exerted on said kite or airfoil and a non-pulling mode when said exerted wind force is minimal.

3. The system according to claim 1, wherein said winch system releases said rope during overstress to allow said control unit to reposition said kite or airfoil.

4. The system according to claim 1, wherein said winch system retracts said kite or airfoil to allow said control system to maintain stability during a sudden loss of wind.

5. The system according to claim 1, wherein said flywheel stores said kinetic energy produced by said kite or airfoil in said pulling mode.

6. A power generating kite system, comprising:
   a kite or an airfoil that receives wind;
   a control unit that includes one or more computers or microcontrollers, GPS receivers and accelerometers that control said kite system;
   a winch system and a rope attached to said kite or airfoil that is automatically controlled by said control unit;
   a launch and recovery system that includes a hydraulic telescoping pole that assists in launching and retrieving said kite or airfoil;
   a yaw motor that turns said kite system at an appropriate angle to increase energy production;

a flywheel that bridges converting kinetic energy from said wind and said kite or airfoil into electrical energy;

a plurality of weather instruments to measure environmental wind speed, wind direction and humidity; and an electrical generator that works in combination with said control unit, said winch system, said launch and recovery system, said yaw motor and said flywheel to generate electrical energy.

7. The system according to claim 6, wherein said kite or airfoil operates in a pulling mode when there is wind force exerted on said kite or airfoil and a non-pulling mode when said exerted wind force is minimal.

8. The system according to claim 6, wherein said kite or airfoil operates at an altitude in the range of 100 to 300 meters.

9. The system according to claim 6, wherein said winch system releases said rope during overstress to allow said control unit to reposition said kite or airfoil.

10. The system according to claim 6, wherein said winch system retracts said kite or airfoil to allow said control system to maintain stability during a sudden loss of wind.

11. The system according to claim 6, wherein said flywheel stores said kinetic energy produced by said kite or airfoil in said pulling mode.

12. The system according to claim 6, wherein said kite system includes a base structure to secure said kite system to a ground surface.

13. A power generating kite system, comprising:

a kite or an airfoil that receives wind;

a control unit that includes one or more computers or microcontrollers, GPS receivers and accelerometers that control said kite system;

a winch system and a rope attached to said kite or airfoil that is automatically controlled by said control unit;

a launch and recovery system that includes a hydraulic telescoping pole that assists in launching and retrieving said kite or airfoil;

a yaw motor that turns said kite system at an appropriate angle to increase energy production;

a flywheel that bridges converting kinetic energy from said wind and said kite or airfoil into electrical energy;

a plurality of weather instruments to measure environmental wind speed, wind direction and humidity;

an electrical generator that works in combination with said control unit, said winch system, said launch and recovery system, said yaw motor and said flywheel to generate electrical energy; and a secure base structure to secure said kite system to a large ship or a ground surface.

14. The system according to claim 13, wherein said kite or airfoil operates in a pulling mode when there is wind force exerted on said kite or airfoil and a non-pulling mode when said exerted wind force is minimal.

15. The system according to claim 13, wherein said kite or airfoil operates at an altitude in the range of 100 to 300 meters.

16. The system according to claim 13, wherein said computers or microcontrollers communicate information over a communications network that includes the Internet, an intranet, a local area network or a wide area network.

17. The system according to claim 13, wherein said winch system releases said rope during overstress to allow said control unit to reposition said kite or airfoil.

18. The system according to claim 13, wherein said winch system retracts said kite or airfoil to allow said control system to maintain stability during a sudden loss of wind.

19. The system according to claim 13, wherein said flywheel stores said kinetic energy produced by said kite or airfoil in said pulling mode.

20. The system according to claim 13, wherein said weather instruments include one or more lightning detectors.

* * * * *